(12) United States Patent
de Jong et al.

(10) Patent No.: US 8,677,861 B2
(45) Date of Patent: Mar. 25, 2014

(54) BLADELESS STRIPPING DEVICE

(75) Inventors: Michael de Jong, Colleyville, TX (US);
Greg James Scherer, Keller, TX (US);
Howard Clark Schwartz, Dallas, TX
(US); Craig Alan Strause, Springtown,
TX (US)

(73) Assignee: Corning Cable Systems LLC, Hickory, NC (US)

( * ) Notice: Subject to any disclaimer, the term of this patent is extended or adjusted under 35 U.S.C. 154(b) by 419 days.

(21) Appl. No.: 13/077,363

(22) Filed: Mar. 31, 2011

(65) Prior Publication Data

US 2012/0247301 A1 Oct. 4, 2012

(51) Int. Cl.
*H02G 1/12* (2006.01)

(52) U.S. Cl.
USPC .............................. 81/9.4; 30/90.1

(58) Field of Classification Search
USPC ............... 81/9.4, 9.44; 30/90.1, 90.4, 1, 91.2, 30/279.6, 283, 351; 83/51, 144, 870
See application file for complete search history.

(56) References Cited

U.S. PATENT DOCUMENTS

| | | | |
|---|---|---|---|
| 1,065,679 A | 6/1913 | Gregson et al. | |
| 1,490,459 A | 4/1924 | Fergusson | |
| 2,503,517 A | 4/1950 | Sirica | |
| 2,609,716 A | 9/1952 | Forman | 81/9.5 |
| 2,681,504 A | 6/1954 | Fox | |
| 3,151,510 A | 10/1964 | Bunker et al. | 81/9.5 |
| 3,771,222 A | 11/1973 | Sakuma | 30/90.1 |
| 4,059,892 A | 11/1977 | Siden | 30/90.1 |
| 4,184,389 A | 1/1980 | Dvorak | 81/9.5 B |
| RE30,342 E * | 7/1980 | Perrino | 81/9.4 |
| 4,715,251 A | 12/1987 | Margolin et al. | 81/9.4 |
| 4,748,871 A | 6/1988 | Zdzislaw | 81/9.4 |
| 4,850,108 A | 7/1989 | Perrino et al. | 30/90.4 |
| 4,947,549 A | 8/1990 | Genovese et al. | 30/90.8 |
| 4,972,581 A | 11/1990 | McCollum et al. | 30/90.1 |
| 5,140,751 A | 8/1992 | Faust | 30/91.1 |
| 5,295,421 A | 3/1994 | Mansfield | 81/9.4 |
| D354,897 S | 1/1995 | Steiner | D8/52 |
| 5,745,943 A * | 5/1998 | Bagley | 7/107 |
| 5,850,773 A | 12/1998 | Burns | 83/159 |
| 6,273,990 B1 | 8/2001 | Bookbinder et al. | 156/344 |

(Continued)

FOREIGN PATENT DOCUMENTS

| | | | |
|---|---|---|---|
| EP | 0046022 A2 | 2/1982 | H01R 43/00 |
| WO | WO2006/130572 A2 | 12/2006 | |

OTHER PUBLICATIONS

Lunninos Industries Ltd., Cable Preparation Tool User Manuel, Revision 9, Nov. 30, 2005, pp. 1-7.

(Continued)

*Primary Examiner* — David B Thomas

(57) ABSTRACT

A bladeless stripping device includes a body having a cutting zone across the body forming a living hinge to fold the body along a fold area. An aperture may be located through the body and may be associated with the fold area. The aperture may change dimension as the body is folded and unfolded. The fiber aperture may receive for example an optical fiber in an unfolded state and may close upon for example the optical fiber in a folded state such that, when the bladeless stripping device is translated along for example the optical fiber at least one coating of for example the optical fiber is caused to be stripped away, revealing for example a bare glass fiber suitable, for example, for connectorizing or splicing.

48 Claims, 10 Drawing Sheets

(56) References Cited

U.S. PATENT DOCUMENTS

| | | | |
|---|---|---|---|
| 6,427,557 B1 | 8/2002 | Krause | 81/9.51 |
| 6,487,939 B1 | 12/2002 | Cowher et al. | 81/9.51 |
| 6,598,509 B2 | 7/2003 | Cook et al. | 83/835 |
| 6,754,960 B1 | 6/2004 | Shiraishi et al. | 30/90.6 |
| 6,895,671 B1 | 5/2005 | Belew et al. | 30/90.4 |
| 7,025,239 B2 | 4/2006 | Itano et al. | 225/95 |
| 7,103,253 B2 | 9/2006 | Mizuno et al. | 385/134 |
| 7,398,599 B2 | 7/2008 | Shiraishi et al. | 30/90.1 |
| 2004/0079201 A1 | 4/2004 | Wiley | 81/9.4 |
| 2005/0044715 A1 | 3/2005 | Shutts et al. | 30/90.1 |
| 2005/0268749 A1 | 12/2005 | Schumacher et al. | 81/9.4 |
| 2006/0265881 A1 | 11/2006 | Serrano et al. | 30/90.4 |
| 2008/0251499 A1 | 10/2008 | Peitrzak et al. | 219/68 |
| 2009/0029569 A1 | 1/2009 | Fiorentino | 439/66 |
| 2010/0000372 A1 | 1/2010 | Daggett et al. | 81/9.4 |
| 2010/0096281 A1 | 4/2010 | Stopek et al. | 206/63.3 |

OTHER PUBLICATIONS

Patent Cooperation Treaty International Search Report, Application No. PCT/US12/29762, Jul. 13, 2012, 3 pages.

* cited by examiner

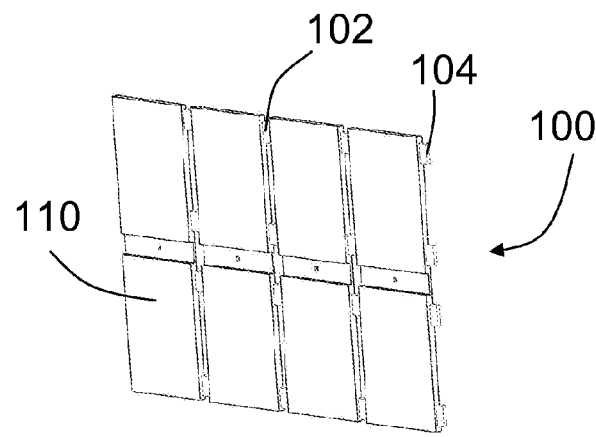
FIG. 5
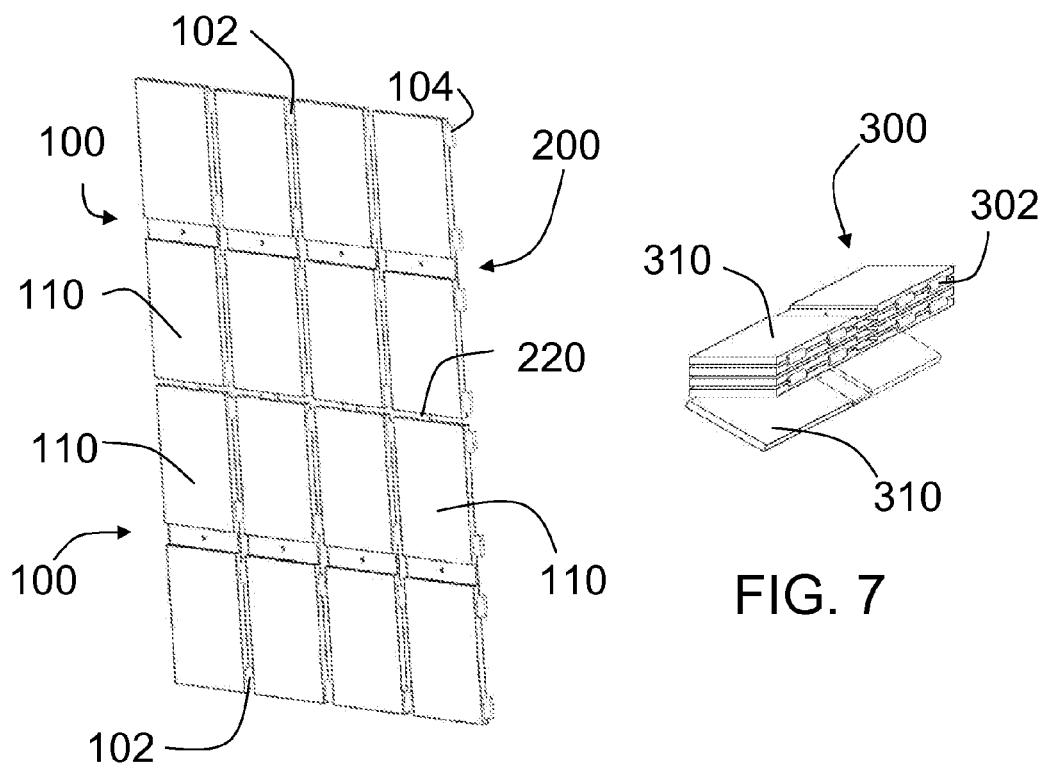
FIG. 6
FIG. 7

BLADELESS STRIPPING DEVICE

BACKGROUND

1. Field of the Disclosure

The disclosure relates generally to a stripping device and more particularly to a bladeless stripping device which may be used to strip at least one coating from an optical element.

2. Technical Field

In the field of fiber optics, glass optical fiber is usually coated with several layers of such protective material as plastics, acrylates to enhance optical qualities, tensile strength and handling characteristics. Such coatings must be removed in order to process the optical fiber; for example, splicing two fibers together or attaching a connector to the fiber. As an example, 900 um buffered optical fiber is usually stripped to the glass surface by the use of stripping tools that incorporate multiple moving parts. The tools are usually held in the hands of the fiber installers and are used to cut away and discard one or more protective buffer layers to expose glass fiber underneath for splicing and connectorizing, requiring time consuming training and practice to operate effectively. Such tools can be expensive and may take at least two passes to remove the buffer and coating, and are typically made from a combination of metal and plastics and resemble copper wire strippers in their appearance and action. These tools may sometimes nick, scratch, or otherwise damage the surface of the optical fiber while removing the coating, creating stress points that may weaken the fiber and causing attenuation events. Additionally, these tools do not provide much tactile feedback to the operator as to when the buffer and more pertinently the coating has been sufficiently removed.

A polymer stripping device is needed that has only one part, reduces the risk of damaging the glass fiber, is inexpensive to manufacture and easy to use.

SUMMARY

One embodiment of the disclosure relates to a stripping device made from a polymer for removing at least one coating from an optical element, for example, an optical fiber, the stripping device including a body, at least one cutting zone across the body and at least one aperture through the body. The body may have a length, a width and a first thickness, the length defining a first axis and the width defining a second axis. The at least one cutting zone across the body may lie along the second axis and may have a second thickness, forming a hinge defining a fold area for folding the body from a substantially unfolded configuration to a substantially folded configuration. The at least one aperture may receive at least one optical element, and may be associated with the fold area. The aperture may have a first aperture width that changes as the body is folded.

The first aperture width may be from about 900 microns ($\mu$m) to about 1000 $\mu$m along the first axis. The first aperture width may change to a second aperture width when the body is folded. The second aperture width may be less than the first aperture width. Specifically, the second aperture width may be from about 50 $\mu$m to about 200 $\mu$m. More specifically, the second aperture width may be from about 100 $\mu$m to about 150 $\mu$m. Still more specifically, the second aperture width may be from about 80 $\mu$m to about 125 $\mu$m.

Additionally, the at least one aperture may be at least one through-hole or through-slot, and also may be an array of through-holes or through slots.

The stripping device may also include opposing wiping feature associated with the cutting zone. The opposing wiping features may be configured to change distance from one another during folding of the stripping device and may ensure the coatings are removed from the optical element by pinching down on the optical element directly behind the aperture.

A method is provided for using the stripping device to remove coatings from an optical element, for example, an optical fiber. The method may include providing a optical element, providing a stripping device, holding the stripping device in a substantially unfolded configuration and substantially perpendicular to the optical element, and inserting an end of the optical element through the aperture for a distance, the distance at least as long as the length of coating to be removed.

The method also may include folding the stripping device along the fold area into a substantially folded configuration, causing the aperture to change from a first aperture width to a second aperture width, the second aperture width being at least as small as the optical element, causing at least a portion of an edge of the aperture to perforate the optical element coating, pushing the folded stripping device along the optical element toward the end of the optical element while maintaining the folded configuration, causing the optical element coating ahead of the folded stripping device to break free from the optical element and slide axially along the optical element.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 5 is a perspective view of a row of stripping devices, configured for easy packaging;

FIG. 6 is a perspective view of a sheet of stripping devices, configured for easy packaging;

FIG. 7 is a perspective view of a folded stack of stripping devices, configured for easy packaging;

DETAILED DESCRIPTION

Figure 1:
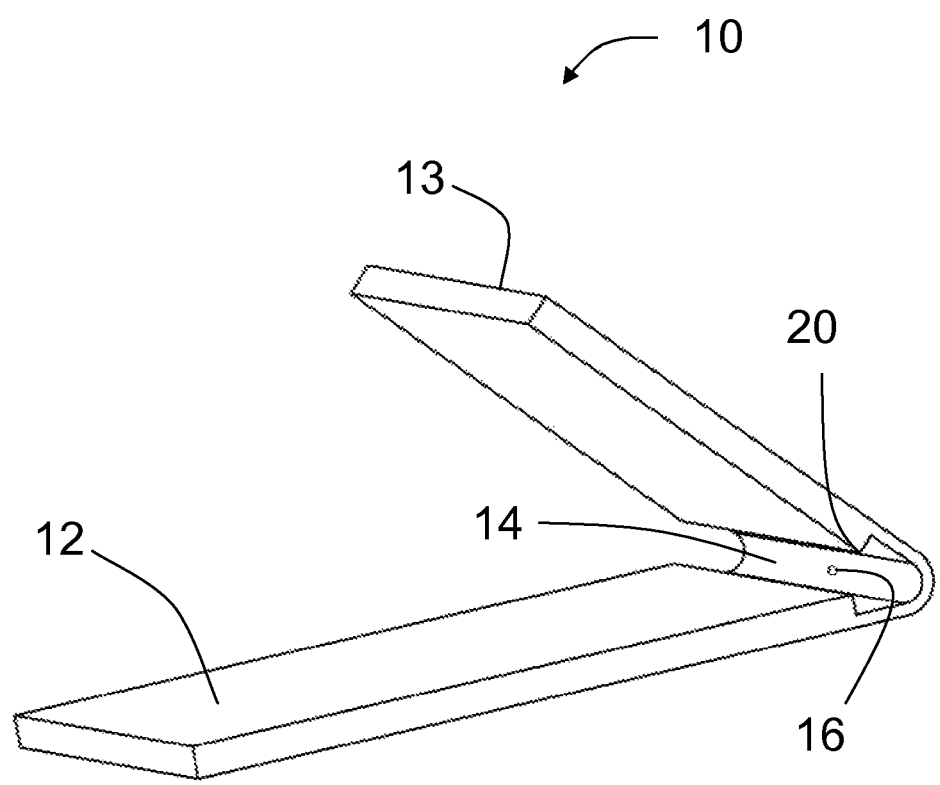
FIG. 1 is a perspective view of a stripping device in a partially folded configuration.

Reference is now made in detail to the present embodiments of the disclosure, examples of which are illustrated in the accompanying drawings. Whenever possible, identical or similar reference numerals are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

A stripping device is disclosed that may strip a portion of at least one coating from an optical element. Specifically, a bladeless stripping device is disclosed that may strip a portion of at least one coating from, for example, an optical fiber, exposing, for example, a portion of a bare glass fiber suitable, for example, for connectorizing or splicing. The stripping device may be, for example, a self contained stripping device having a single part, requiring no additional parts, e.g., blades, to operate effectively to remove the at least one coating from the optical element.

Various embodiments will be further clarified by the following examples.

Figure 2:
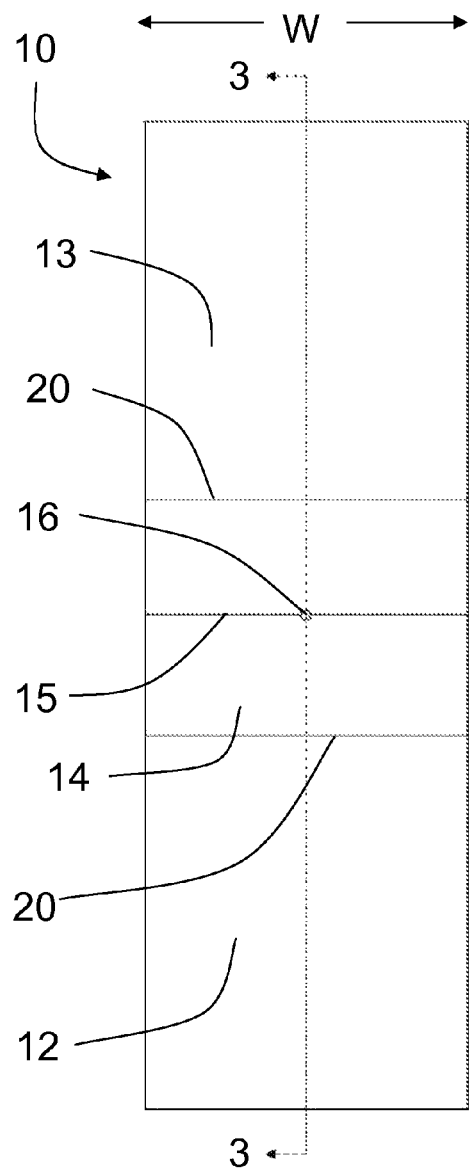
FIG. 2 is a top view of the stripping device of FIG. 1.
Figure 3:
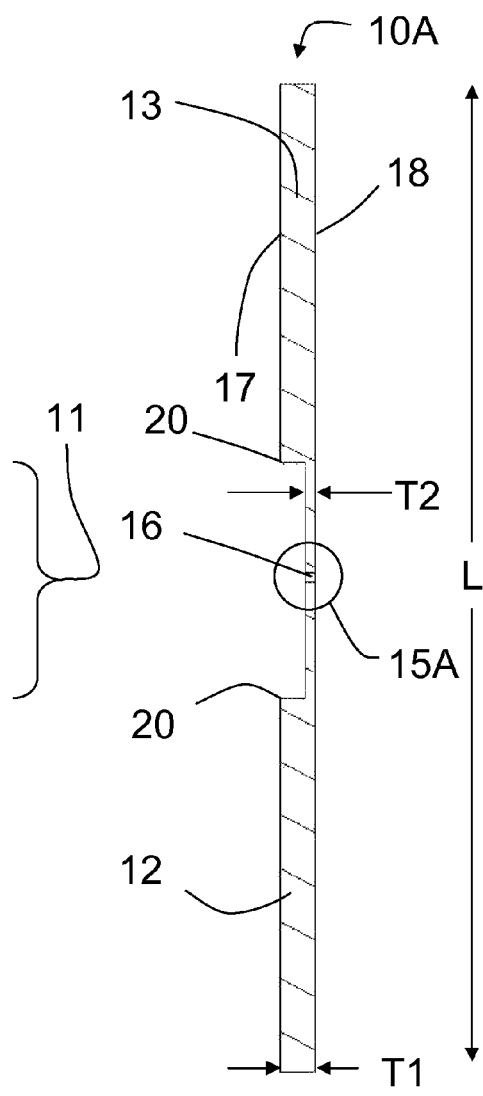
FIG. 3 is a side cutaway view of the stripping device of FIG. 2.
Figure 4A:
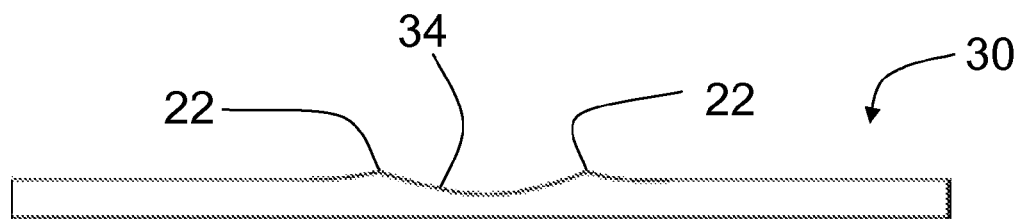
FIGS. 4A-4D are alternate embodiments of the stripping device of FIGS. 1-3.
Figure 4B:
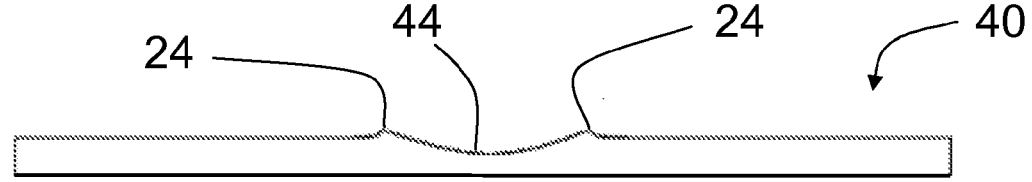
Figure 4C:
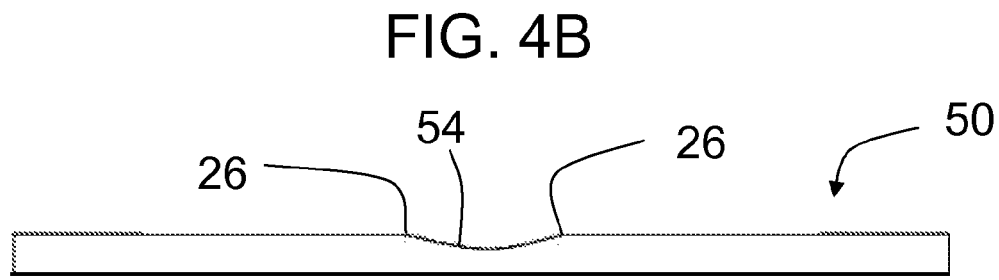
Figure 4D:
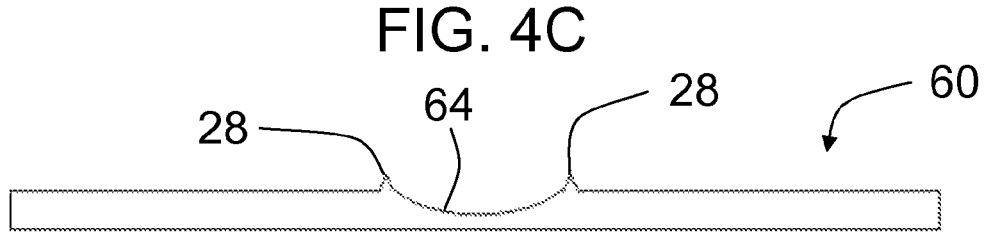

An exemplary stripping device 10 may include a body, the body having a first lever arm 12 and a second lever arm 13, at least one cutting zone 11 substantially across body and at least one aperture 16 through the body (FIGS. 1-3). The body may include a length L defining a first axis, a width W defining a second axis and a first thickness T1. In exemplary embodiments, length L may be larger than width W; for example, length L may be from 1.0 to 4.0 times larger than width W. In exemplary embodiments, cutting zone 11 may be located on front 17 and substantially along the second axis, and may be selected from a channel, a groove, a rut, etc. However, cutting zone 11 may be located along the body at an alternate location, for example, along the first axis, without straying from the spirit of this disclosure. In exemplary embodiments, the body may define a fold area 14. Fold area 14 may include, for example, a fold line 15, such as a notch or a groove, to enhance the ability of stripping device 10 to be folded. For purposes of this disclosure, "fold area" is defined as a region where a preference for bending exists on the body, for example, along cutting zone 11. Cutting zone 11 may have a second thickness T2 along at least a portion of cutting zone 11. Cutting zone 11, alone or with fold area 14, may exemplify a hinge, for example, a living hinge.

Figures 8, 9:
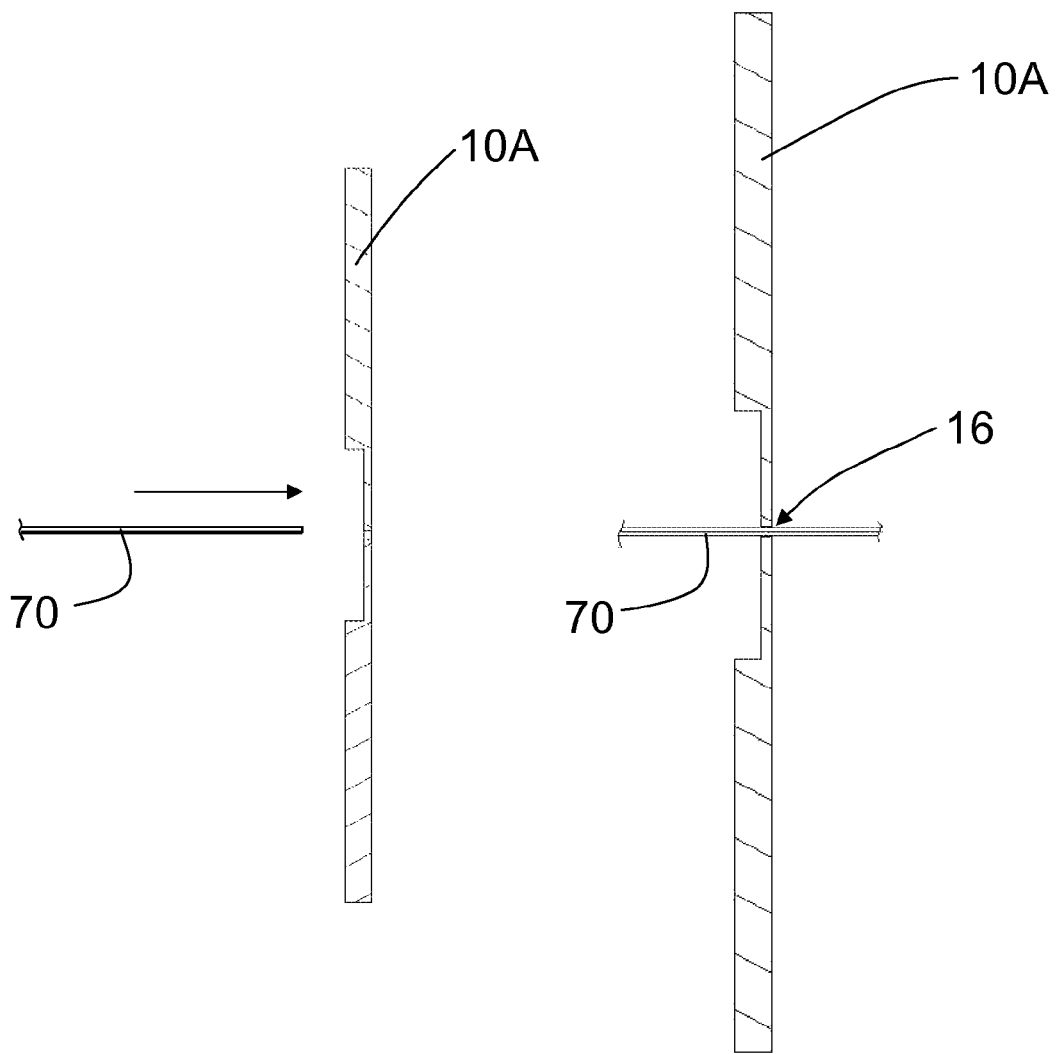
FIG. 8 is a side view of the stripping device of FIG. 3 prepared to receive an optical element.
FIG. 9 is a side view of the stripping device of FIG. 3 having received an optical element.
Figures 15A, 15B:
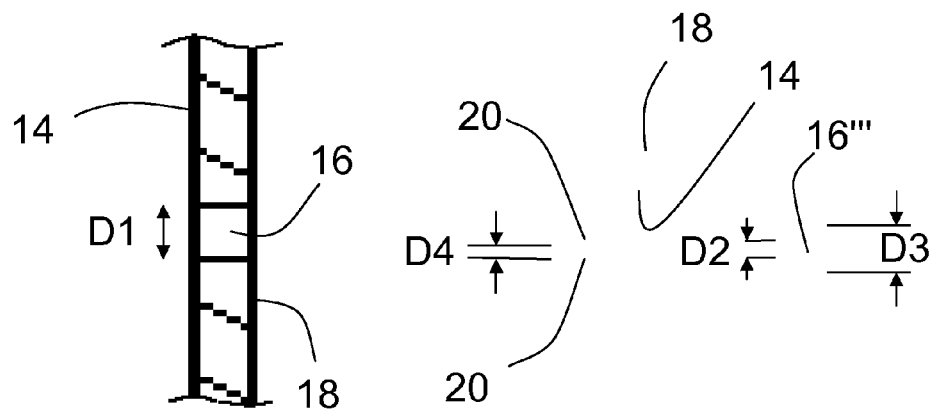
FIG. 15A is a cutaway detail of part of the side cutaway view of the stripping device of FIG. 3 showing the aperture.
FIG. 15B is a cutaway detail of part of the side view of the stripping device of FIG. 14 showing a change in the dimension of the aperture while in the folded configuration.
Figure 16:
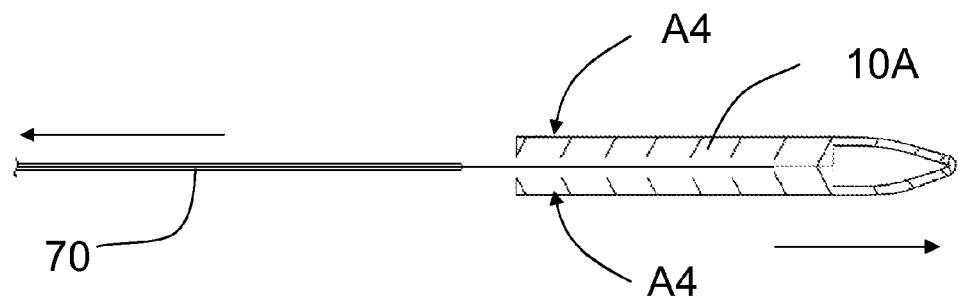
FIG. 16 is a side cutaway view of the stripping device in a fully closed configuration.

In exemplary embodiments, stripping device 10 may also include at least one aperture 16. Aperture 16 may, for example, be a single through-hole suitable for receiving a single optical element. In some embodiments, aperture 16 may include, for example, an array of through-holes. In alternate embodiments, aperture 16 may be a through-slot suitable, for example, for receiving an array of optical elements, for example, simultaneously. In exemplary embodiments, aperture 16 may be associated with, e.g., pass through, fold area 14 and have a first aperture width D1 (see FIG. 15A) at least at the interface of aperture 16 and cutting zone 11. Width D1 may be any width suitable to receive a desired optical element, for example, an optical fiber. In exemplary embodiments, width D1 may be from about 1000 microns (μm) to about 900 μm when stripping device 10 is in a substantially unfolded configuration. However, when stripping device 10 changes from a partially folded to a fully folded configuration, width D1 may change incrementally during folding to a second aperture width D2 (see FIG. 8B). In exemplary embodiments, width D2 may be, for example, from about 50 μm to about 200 μm. In further exemplary embodiments, width D2 may be, for example, from about 100 μm to about 150 μm. In yet further exemplary embodiments, width D2 may be, for example, from about 80 μm to about 125 μm.

Cutting zone 11 may be associated with at least one wiping feature 20 (FIGS. 1-3). Wiping feature 20 may delineate opposing boundaries of cutting zone 11, for example, perpendicular to the first axis of stripping device 10. In an exemplary embodiment, wiping feature 20 may be substantially angular, such as in a right angle, for example. Alternate stripping device embodiments 30, 40, 50 and 60 may have alternate wiping features 22, 24, 26, and 28, respectively, having alternate shapes (FIGS. 4A-4D). The surface of cutting zone 11 of stripping device 10 may have a substantially unfolded profile and be substantially parallel to back 18 in an unfolded configuration. Alternate embodiments may have cutting zones 34, 44, 54 and 64, respectively, having, for example, curved profiles. For purposes of this disclosure, stripping device 10 and the features associated with stripping device 10 will be used to exemplify the stripping devices of this disclosure.

In exemplary embodiments, when stripping device 10 is in a substantially unfolded configuration the straight line distance from each of opposing wiping features 20 may be, for example, as much as the distance across cutting zone 11. However, when stripping device 10 is partially or fully folded that distance may change incrementally to a smaller wiping feature distance, D4 (see FIG. 15B). Distance D4 may be, for example, as small as about 0.0 μm (touching) when stripping device 10 is in a fully folded configuration.

In exemplary embodiments, stripping device 10 may be, for example, a self contained stripping device, for example, a single part, requiring no additional parts, for example, discrete blades, to operate effectively to remove at least one coating from an optical element. In exemplary embodiments, stripping device 10 may be made from, as an example, a thermoplastic polymer, for example, such a thermoplastic polymer as ULTEM®, available from SABIC Innovative Plastics, Pittsfield, Mass., and may be made using, for example, an injection molding manufacturing process. However, any suitable material may be used that may contact the optical element while at the same time not the surface of the optical element.

Stripping device 10 may be manufactured as, for example, a single device or may be mass produced and packaged as multiple devices (FIGS. 5-7). A strip 100 (FIG. 5) of linearly interconnected stripping devices 110 may be connected by, for example, a weakened area 102. In exemplary embodiments weakened area 102 may be, for example, a tearable or breakable tab 104. In other exemplary embodiments, weakened area may be a pinched area, suitable for tearing or breaking, demarcating individual stripping devices 110. In further embodiments, a sheet 200 (FIG. 6) may include multiple strips 100 of stripping devices 110. Strips 100 may be conjoined by such a weakened area as area 220, similar to weakened area 102. In yet further embodiments, stripping devices 10 may be packed as a folded stack 300 (FIG. 7), including multiple stripping devices 310 interconnected by a foldable area 302. Foldable area 302 may be, for example, a living hinge. Other mass production and packaging embodiments such as rolls may also be contemplated.

In exemplary operation, an optical element 70 (FIG. 8) having at least one coating to be removed may have an end of the optical element inserted into aperture 16 of provided stripping device 10. Optical elements may include an upcoated optical fiber, such as a tight buffered optical fiber. The tight buffered optical fiber may include a core, a cladding, the cladding surrounding the core, and at least one coating, the at least one coating surrounding the cladding; an upcoating, the upcoating being, for example, a radiation curable material that surrounds the optical fiber, the upcoating being strippable from the optical fiber; and a slip layer, the slip layer being disposed between the optical fiber and the upcoating, the slip layer including, for example, a micronized poly-tetra-fluoro-ethylene (PTFE), a silicone, and a dispersing agent, and the slip layer may have an uncured viscosity of about 500 centipoise or greater, a modulus of about 500 MPa or greater, and a tensile strength of about 20 MPa or greater measured using ASTM D638, wherein a surface tension of the slip layer may be lower than a surface tension of the upcoating, thereby creating a relatively low-adhesion between the upcoating and the slip layer. Optical elements may also include such a buffered optical fiber as a loose buffered optical fiber, having at least an optical fiber with at least a 900 μm polyethylene tube. Optical element coatings to be removed may include, but are not limited to: plastics, such as tight buffered coatings on optical elements, loose buffered coatings on optical fibers; acrylate coatings on optical fibers; glass cladding material on optical fibers; or combinations thereof.

Figure 10:
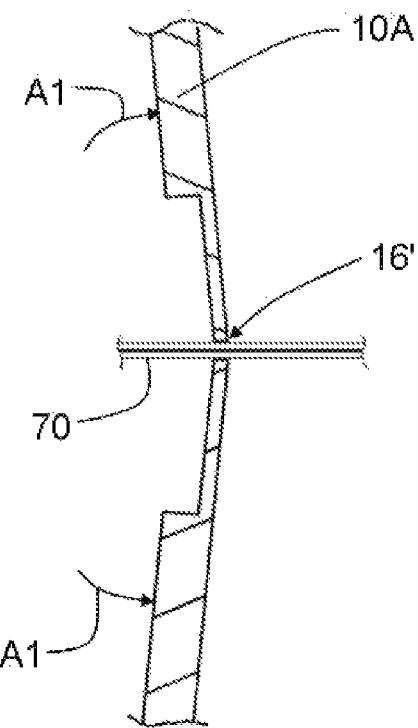
FIG. 10 is a close up cutaway view of the stripping device having received an optical element, the stripping device in a partially folded configuration.
Figure 11:
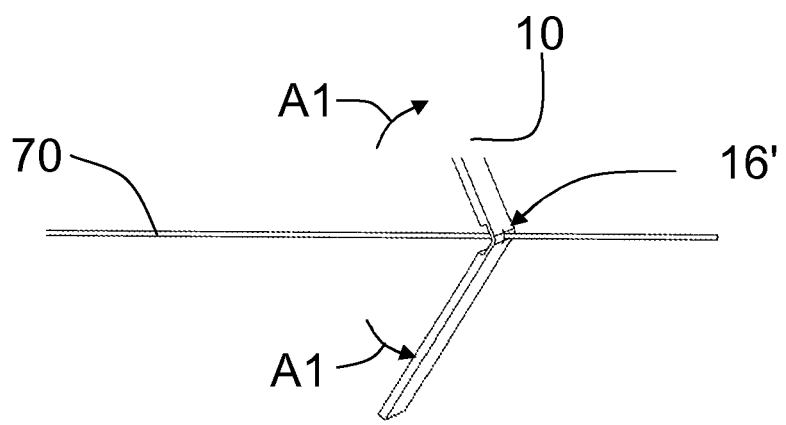
FIG. 11 is a perspective side view of the stripping device having received an optical element, the stripping device in a partially folded configuration.

With stripping device 10A (FIGS. 8 and 9) held in a substantially unfolded configuration and substantially perpendicular to fiber 70, fiber 70 may be axially pushed or pulled through aperture 16 for a distance, for example, at least as long as the length of coating to be removed. Optical element 70 may be inserted from front 17 or back 18, and in exemplary embodiments may be inserted from front 17. Once optical element 70 is inserted, stripping device 10A may be folded in either direction to begin engaging optical element 70 (FIGS. 10 and 11), and in exemplary embodiments maybe folded toward the front 17. In exemplary embodiments, initial width D1 of aperture 16 is very close in size to the optical element to be stripped. At a first angle A1, for example, the relative inside angle between first lever arm 12 and second lever arm 13 the edges of aperture 16 may make contact with optical element 70, changing the shape of aperture 16 to a new shape, aperture 16' (FIG. 10). Angle A1 may be from, for example, up to about 180 degrees, about 180 degrees to about 90 degrees, such as from about 180 degrees to about 160 degrees, and in exemplary embodiments such as about 180 degrees to about 170 degrees, and in exemplary embodiments such as about 180 degrees to about 175 degrees. At such an angle A1, initial contact may begin, for example, the process of impinging one or more coatings on, for example, optical element 70.

Figure 12:
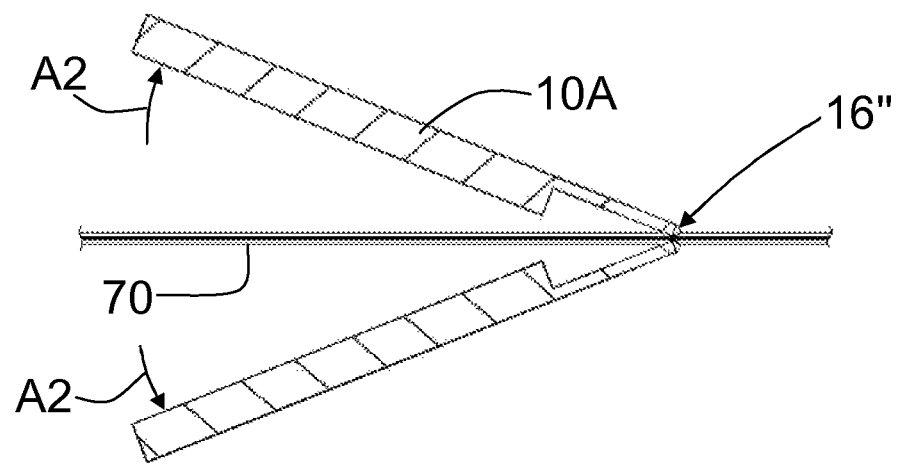
FIG. 12 is a cutaway side view of the stripping device having received an optical element, the stripping device having an increased folded configuration.

During folding, aperture 16' may fully impinge the coatings on optical element 70 at an angle A2, changing the shape of aperture 16' to another new shape, aperture 16" (FIG. 12). Angle A2 may be from, for example, about 180 degrees to about 10 degrees, such as from about 90 degrees to about 10 degrees, and in exemplary embodiments such as about 45 degrees to about 10 degrees. Folding stripping device 10 along, for example, fold area 14 into a substantially folded configuration may cause aperture 16 to change shape, resulting in a portion of aperture 16 changing from first aperture width D1 to a second aperture width D2, which may be smaller than the width of optical element 70 within aperture 16. Also, another portion of aperture 16 may change from first aperture width D1 to a third aperture width D3 (see FIG. 15B), third aperture width D3 being larger than first aperture width D1. In an exemplary embodiment, third aperture width D3 may be from, for example, about 1000 microns (μm) to about 2000 μm. At least a portion of opposite edges of aperture 16" along, for example, the first axis having second aperture width D2 may then impinge, or perforate, at least one optical element coating on the optical element, and in exemplary embodiments may perforate multiple optical element coatings. In exemplary embodiments, portions of aperture 16 may change gradually from width D1 to widths D2 and D3 during folding. Width D2 may be any final width suitable to perforate one or more optical element coatings sufficiently to be compromised and removable around optical element 70. Width D3 may provide, for example, a pushing wall or bell shaped scraping device to further assist with coating removal.

Figure 13:
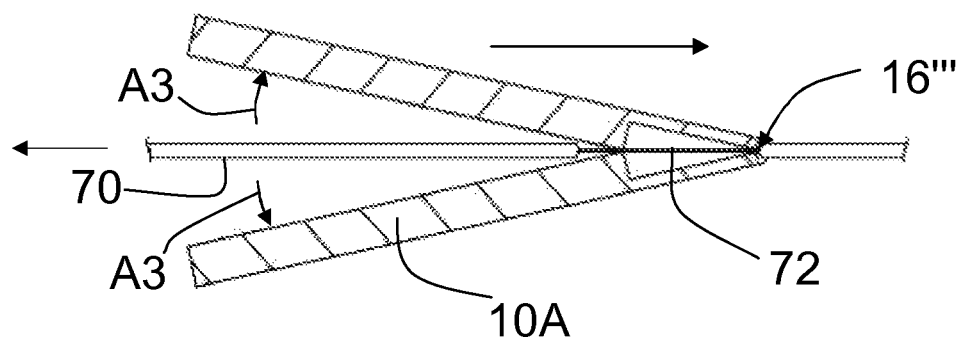
FIG. 13 is a cutaway side view of the stripping device having received an optical element, the stripping device having an even more increased folded configuration, the optical element being partially stripped of at least one coating.
Figure 14:
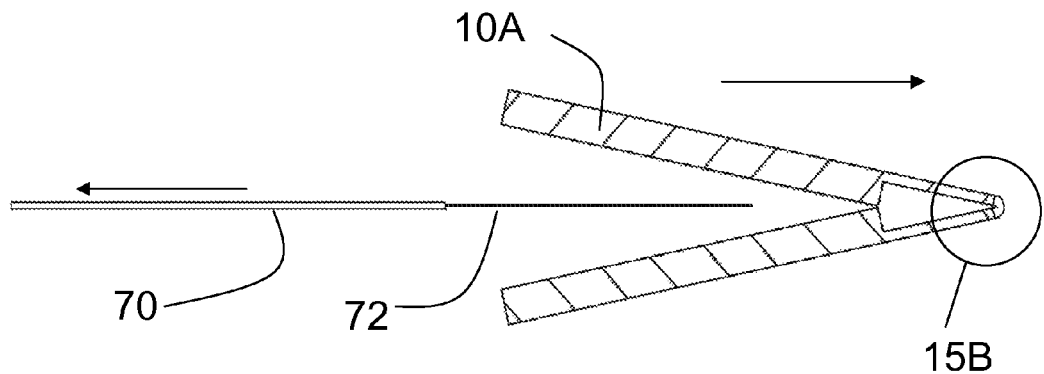
FIG. 14 is a cutaway side view of the stripping device after stripping at least one coating from the optical element.

Stripping device 10A may be further folded to angle A3, for example, an angle that causes wiping features 20 to be substantially close together, such as almost or actually touching (FIG. 13). Angle A3 may be from, for example, about 90 degrees to about 10 degrees, such as from about 45 degrees to about 10 degrees, and in exemplary embodiments such as about 20 degrees to about 5 degrees. When folded to, for example, angle A3, aperture 16" may change shape to yet another new shape, aperture 16'''.

Figure 17:
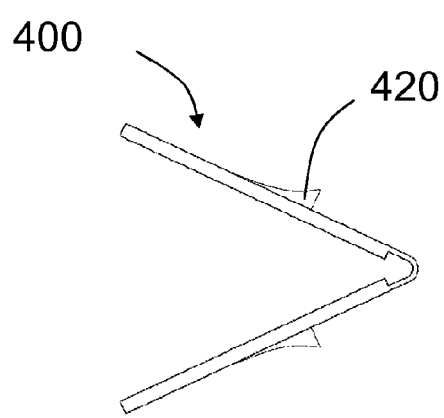
FIGS. 17 and 18 are two different views of exemplary embodiments of the stripping device having tactile features for pushing and pulling.
Figure 18:
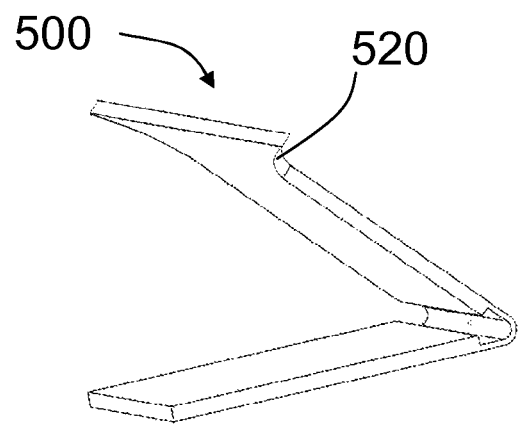

In exemplary embodiments, stripping devices 400 and 500 may include a tactile aid feature, such as a pushing feature 420 on stripping device 400 (see FIG. 17) and a pulling feature 520 on stripping device 500 (see FIG. 18). Stripping device 10A may be translated, for example, by pulling or pushing stripping devices 10, 10A, 110, 310, 400, 500 axially, for example, by hand or by an apparatus, along, for example, optical element 70 while being held in a substantially folded position, causing the coatings to separate axially along the optical element 70 for removal.

Figure 19:
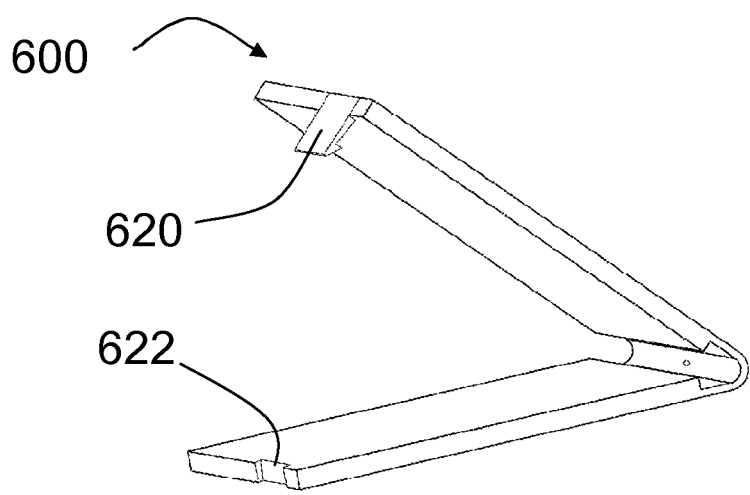
FIG. 19 is a perspective view of an exemplary embodiment of the stripping device having a latching feature.

In an exemplary embodiment, stripping devices 10, 10A, 110, 310, 400, 500 may be substantially fully folded to an angle A4. Such stripping devices 10, 10A, 110, 310, 400, 500 may include a latching feature, for example a latch arm 620 and a latch receiver 622 for locking stripping devices 10, 10A, 110, 310, 400, 500 in a substantially closed position (FIG. 19). Fully closing stripping devices 10, 10A, 110, 310, 400, 500 may provide, for example, additional wiping to further assist wiping features 20.

By securing optical element 70 relative to stripping device 10, stripping device 10 may be pushed axially along optical element 70 toward the end of optical element 70 while maintaining the folded configuration. In exemplary embodiments, a force of from about 1 pounds (lbs) to about 10 lbs, and more specifically from about 2 lbs to about 5 lbs, may be generated while translating stripping device 10 along optical element 70. Translating stripping device 10 along optical element 70 may cause the optical element coating to break free from the optical element and to slide axially along the optical element ahead of aperture 16 until the coating is removed (FIG. 13), exposing a length of the optical element 72 beneath the coatings. In exemplary embodiments, pressure may be applied, for example, by an operator's fingers, to stripping device 10 near cutting zone 11 and aperture 16 while translating stripping device 10 axially along optical element 70.

Additionally, opposing wiping features 20 may provide a secondary stripping operation, helping to ensure a clean strip using only a single pass. While in the fully folded configuration, wiping features 20 may also encounter optical element 70. During translation, the stripping action of aperture 16 may be assisted by a pinching force of opposing wiping features 20 directly behind aperture 16, ensuring that any coating material inadvertently left by aperture 16 will be removed by opposing wiping features 20. The pinching force may be enhanced, for example, by the applied finger pressure.

Additionally, strippers 10, 10A, 110, 310, 400, 500 may include an array of through-holes for receiving multiple optical elements, for example, individually. Also, strippers 10, 10A, 110, 310, 400, 500 may include at least one through-slot, the at least one through-slot being an aperture adapted for receiving an array of optical elements, for example a ribbon of optical elements, within the same aperture.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A stripping device for stripping at least one coating from an optical element, the device comprising:
   a body, the body having a length, a width and a first thickness, the length defining a first axis and the width defining a second axis;
   at least one cutting zone across a surface of the body, the cutting zone having a second thickness, the cutting zone comprising at least one hinge defining a fold area for folding the body from a substantially unfolded configuration to a substantially folded configuration; and
   at least one aperture for receiving at least one optical element, the aperture associated with the fold area, the aperture having a first aperture width that changes as the body is folded, for stripping at least one coating from the at least one optical element.

2. The device of claim 1, the body including at least a first lever arm and a second lever arm for folding the body, the lever arms associated with the cutting zone.

3. The device of claim 2, further including at least one wiping feature.

4. The device of claim 3, the at least one wiping feature being opposing wiping features associated with the cutting zone, the opposing wiping features separated by a distance across the cutting zone, the distance across the cutting zone changeable during folding of the stripping device.

5. The device of claim 2, the first lever arm and the second lever arm having a first angular distance up to about 180 degrees.

6. The device of claim 5, the first lever arm and the second lever arm moveable relative to each other to a second angular distance that is less than the first angular distance.

7. The device of claim 2, the first aperture width being from about 900 μm to about 1000 μm along the first axis.

8. The device of claim 7, the first aperture width changing to a second aperture width when the body is folded along the fold area, the second aperture width being less than the first aperture width.

9. The device of claim 8, the second aperture width being from about 50 μm to about 200 μm.

10. The device of claim 8, the second aperture width being from about 100 μm to about 150 μm.

11. The device of claim 8, the second aperture width being from about 80 μm to about 125 μm.

12. The device of claim 2, the at least one aperture being at least one through-hole, the through-hole changing shape as the body is folded from a substantially unfolded configuration to a substantially folded configuration.

13. The device of claim 12, the at least one aperture being an array of through-holes.

14. The device of claim 2, the at least one aperture being at least one through-slot, the at least one through-slot being adapted for receiving an array of optical elements.

15. The device of claim 1, the optical element being an optical fiber, the optical fiber including at least one glass core and at least one coating around the glass core, the coating including an annular cladding.

16. The device of claim 15, the optical element being an optical cable, the optical cable including at least one optical fiber and at least one coating around the optical fiber, the coating including a polymer coating.

17. The device of claim 1, the stripping device including a latch feature for locking the stripping device in a substantially folded configuration.

18. The device of claim 1, the stripping device comprising a single part.

19. The device of claim 1, the stripping device made from a polymer.

20. The device of claim 1, the stripping device comprising an array of stripping devices joined together, the stripping devices being conjoined stripping devices separable from each other along at least one separation feature.

21. A stripping device assembly, comprising:
   a plurality of stripping devices, the plurality of stripping devices comprising an array of conjoined stripping devices, the conjoined stripping devices being separable from each other along at least one separation feature, each conjoined stripping device comprising:
   a body, the body having a length, a width and a first thickness, the length defining a first axis and the width defining a second axis;
   at least one cutting zone across a surface of the body, the cutting zone having a second thickness, the cutting zone comprising at least one hinge defining a fold area for folding the body from a substantially unfolded configuration to a substantially folded configuration; and
   at least one aperture for receiving at least one optical element, the aperture associated with the fold area, the aperture having a first aperture width that changes as the body is folded, for stripping at least one coating from the at least one optical element.

22. The assembly of claim 21, the body including at least a first lever arm and a second lever arm for folding the body, the lever arms associated with the cutting zone.

23. The assembly of claim 22, the first lever arm and the second lever arm having a first angular distance up to about 180 degrees.

24. The assembly of claim 22, the first lever arm and the second lever arm moveable relative to each other to a second angular distance from about 0 degrees to about 90 degrees.

25. The assembly of claim 22, the first aperture width being from about 900 µm to about 1000 µm along the first axis.

26. The assembly of claim 22, the first aperture width changing to a second aperture width when the body is folded along the fold area, the second aperture width being less than the first aperture width.

27. The assembly of claim 26, the second aperture width being from about 50 µm to about 200 µm.

28. The assembly of claim 26, the second aperture width being from about 100 µm to about 150 µm.

29. The assembly of claim 26, the second aperture width being from about 80 µm to about 125 µm.

30. The assembly of claim 22, the at least one aperture being at least one through-hole, the through-hole changing shape as the body is folded from a substantially unfolded configuration to a substantially folded configuration.

31. The assembly of claim 30, the at least one aperture being an array of through-holes.

32. The assembly of claim 22, the at least one aperture being at least one through-slot, the at least one through-slot being adapted for receiving an array of optical elements.

33. The assembly of claim 22, each conjoined stripping device further including opposing wiping features associated with the cutting zone, the opposing wiping features configured to change distance from one another during folding of the stripping assembly.

34. The assembly of claim 21, the optical element being an optical fiber, the optical fiber including at least one glass core and at least one coating around the glass core, the coating including at least an annular cladding.

35. The assembly of claim 34, the optical element being an optical cable, the optical cable including at least one optical fiber and at least one coating around the optical fiber, the coating including at least a polymer coating.

36. The assembly of claim 21, each conjoined stripping device including a latch feature for locking the stripping device in a substantially folded configuration.

37. The assembly of claim 21, the array of conjoined stripping devices comprising a row of at least two conjoined stripping devices.

38. The assembly of claim 37, the array of conjoined stripping devices comprising a sheet of at least two conjoined rows of conjoined stripping devices.

39. A method for removing coatings from an optical element, the method comprising:
providing an optical element, the optical element having at least one coating thereon;
providing a stripping device adapted for folding, the stripping device comprising a body having at least one cutting zone across the body defining a fold area with an aperture having a first aperture width, the aperture associated with the fold area;
holding the stripping device in a substantially unfolded configuration and substantially perpendicular to the optical element;
inserting an end of the optical element through the aperture for a distance, the distance at least as long as the length of coating to be removed;
folding the stripping device along the fold area into a substantially folded configuration, causing the aperture to change from a first aperture width to a second aperture width, the second aperture width being at least as small as the optical element, causing at least a portion of an edge of the aperture to perforate the optical element coating; and
translating the folded stripping device along the optical element toward the end of the optical element while maintaining the folded configuration, causing the optical element coating ahead of the folded stripping device to break free from the optical element and slide axially along the optical element.

40. The method of claim 39, the optical element being an optical fiber.

41. The method of claim 39, the stripping device including opposing wiping features associated with the at least one cutting zone.

42. The method of claim 41, further including the step of pinching the optical element with the opposing wiping features.

43. The method of claim 39, the stripping device including a latch feature.

44. The method of claim 43, further including the step of locking the stripping device with the latching feature into the substantially folded configuration.

45. The method of claim 39, including the step of independently securing the optical element and the stripping device relative to each other.

46. The method of claim 45, including the step of pulling the optical element out of the stripping device while the stripping device remains substantially stationary.

47. The method of claim 45, including the step of pulling the optical element out of the stripping device while the stripping device is pushed along the optical element at about the same time.

48. The method of claim 45, including the step of pushing the stripping device along the optical element while the optical element remains substantially stationary.

* * * * *